(12) United States Patent
Niizuma

(10) Patent No.: US 9,564,759 B2
(45) Date of Patent: Feb. 7, 2017

(54) WIRELESS POWER SUPPLY SYSTEM

(71) Applicant: IHI Corporation, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 14/813,270

(22) Filed: Jul. 30, 2015

(65) Prior Publication Data

US 2015/0333540 A1    Nov. 19, 2015

Related U.S. Application Data

(63) Continuation of application No. PCT/JP2013/080447, filed on Nov. 11, 2013.

(30) Foreign Application Priority Data

Feb. 4, 2013    (JP) .................. 2013-019614

(51) Int. Cl.
| | | |
|---|---|---|
| H01F 27/42 | (2006.01) | |
| H02J 5/00 | (2016.01) | |
| B63G 8/00 | (2006.01) | |
| H02J 17/00 | (2006.01) | |
| H02J 7/02 | (2016.01) | |
| H02J 7/00 | (2006.01) | |
| B60L 11/18 | (2006.01) | |

(52) U.S. Cl.
CPC ............. *H02J 5/005* (2013.01); *B60L 11/182* (2013.01); *B60L 11/1824* (2013.01); *B60L 11/1829* (2013.01); *B60L 11/1833* (2013.01); *B63G 8/001* (2013.01); *H02J 7/0054* (2013.01); *H02J 7/025* (2013.01); *H02J 17/00* (2013.01); *H02J 50/12* (2016.02); *B60L 2200/32* (2013.01)

(58) Field of Classification Search
CPC .................................. H02J 50/00; H02J 50/12
See application file for complete search history.

(56) References Cited

U.S. PATENT DOCUMENTS

| | | | |
|---|---|---|---|
| 5,301,096 A | * | 4/1994 | Klontz .................... H01F 38/14 320/108 |
| 6,390,012 B1 | | 5/2002 | Watt et al. |
| 2007/0024234 A1 | | 2/2007 | Potter et al. |
| 2008/0144442 A1 | | 6/2008 | Combee et al. |

(Continued)

FOREIGN PATENT DOCUMENTS

| | | |
|---|---|---|
| CN | 101590904 A | 12/2009 |
| CN | 102684276 A | 9/2012 |

(Continued)

OTHER PUBLICATIONS

International Search Report, PCT/JP2013/080447, Jan. 28, 2014, 2 pgs.

(Continued)

*Primary Examiner* — Daniel Cavallari
(74) *Attorney, Agent, or Firm* — Volpe and Koenig, P.C.

(57) ABSTRACT

A wireless power supply system includes a first underwater vehicle that has a power-receiving coil for wirelessly receiving electric power and a second underwater vehicle that has a power-supplying coil for wirelessly supplying electric power and transmits electric power between the power-receiving coil and the power-supplying coil while moving in parallel to the first underwater vehicle.

9 Claims, 4 Drawing Sheets

(56) References Cited

U.S. PATENT DOCUMENTS

| | | |
|---|---|---|
| 2010/0007214 A1 | 1/2010 | Howard et al. |
| 2010/0104031 A1 | 4/2010 | Lacour |
| 2011/0177779 A1* | 7/2011 | Rhodes .................. H04B 11/00 455/40 |
| 2012/0298030 A1* | 11/2012 | Lee .......................... B63G 8/08 114/337 |
| 2014/0088804 A1* | 3/2014 | Hyde .................... H02J 7/0054 701/22 |

FOREIGN PATENT DOCUMENTS

| | | | |
|---|---|---|---|
| CN | 102709993 | A | 10/2012 |
| EP | 2838174 | A1 | 2/2015 |
| JP | 02-032721 | A | 2/1990 |
| JP | 2004-289953 | A | 10/2004 |
| JP | 2005-168085 | A | 6/2005 |
| JP | 2005-210843 | A | 8/2005 |
| JP | 2010-523030 | A | 7/2010 |
| JP | 2011-035953 | A | 2/2011 |
| JP | 2013-051855 | A | 3/2013 |

OTHER PUBLICATIONS

Kojiya, T., et al., "Automatic power supply system to underwater vehicles utilizing noncontacting technology," OCEANS '04, MTTS/IEEE TECHNO-OCEAN '04 Kobe, Japan Nov. 9-12, 2004, Piscataway, NJ USA, IEEE, vol. 4, Nov. 9, 2004 (Nov. 9, 2004), pp. 2341-2345, XP010776789; DOI:10.1109/OCEANS.2004.1406521 ISBN: 978-0-7803-8669-3.

* cited by examiner

WIRELESS POWER SUPPLY SYSTEM

This application is a continuation application based on a PCT Patent Application No. PCT/JP2013/080447, filed on Nov. 11, 2013, whose priority is claimed on Japanese Patent Application No. 2013-019614, filed on Feb. 4, 2013. The contents of both the PCT Application and the Japanese Application are incorporated herein by reference.

TECHNICAL FIELD

The present disclosure relates to a wireless power supply system.

BACKGROUND ART

For example, Patent Documents 1 and 2 disclose a wireless power supply system that wirelessly supplies electric power from a storage battery installed in an underwater vehicle to a storage battery installed in an underwater facility. Since oxygen cannot be supplied from the surroundings under water unlike on the ground, an underwater vehicle often uses a storage battery (such as a lithium ion battery, a nickel hydrogen battery, or a lead storage battery) as a power source.

The term "wireless" in such a wireless power supply system means that an electric power transmission wire of a power-transmitter does not directly contact with an electric power transmission wire of a power-receiver, and does not mean that a structure in which one of the power-transmitter and the power-receiver is installed is not in contact with a structure in which the other of the power-transmitter and the power-receiver is installed. For stable transmission of electric power, it is desirable that the positional relationship between the power-transmitter and the power-receiver be fixed. Accordingly, as disclosed in Patent Documents 1 and 2, both structures are firmly fitted and fixed to each other during the transmission of electric power.

CITATION LIST

Patent Document

[Patent Document 1]
Published Japanese Translation No. 2010-523030 of the PCT International Publication for Patent Applications
[Patent Document 2]
Japanese Unexamined Patent Application, First Publication No. H2-32721

SUMMARY

Technical Problem

However, when a target of electric power supply is an underwater vehicle on a mission such as underwater exploration, the underwater vehicle has to temporarily stop the mission for electric power supply, and an availability of the underwater vehicle decreases.

In addition, under water, a large force may act in a direction in which the structures are separated from each other due to a rapid change of a tidal current, an influence from big waves, collisions with fish, or the like. When the large force acts, if the structures are firmly fitted to each other as disclosed in Patent Documents 1 and 2, the fitted portion may be damaged and may have to be repaired, and an operator's burden will increase.

The present disclosure is made in consideration of the aforementioned problems and an object of the present disclosure is to provide a wireless power supply system that can enhance an availability of an underwater vehicle and prevent the underwater vehicle from being damaged.

Solution to Problem

According to an aspect of the present disclosure, there is provided a wireless power supply system including: a first underwater vehicle that has a power-receiver for wirelessly receiving electric power; and a second underwater vehicle that has a power-transmitter for wirelessly supplying electric power and transmits electric power between the power-receiver and the power-transmitter while moving in parallel to the first underwater vehicle.

Advantageous Effects

According to the present disclosure, a second underwater vehicle wirelessly supplies electric power to a first underwater vehicle while moving in parallel to the first underwater vehicle. Accordingly, in the present disclosure, the first underwater vehicle can be supplied with electric power while carrying out a mission, and the availability of the first underwater vehicle is increased. The wireless supply of electric power is possible even when positions of the power-receiver and the power-transmitter are misaligned to some extent. As the second underwater vehicle moves in parallel to the first underwater vehicle, it is possible to eliminate necessity for providing a fitting portion which may be damaged when an external force is applied.

Therefore, according to the present disclosure, it is possible to provide a wireless power supply system that can enhance an availability of an underwater vehicle and prevent the underwater vehicle from being damaged.

DESCRIPTION OF EMBODIMENTS

Hereinafter, embodiments of the present disclosure will be described with reference to the accompanying drawings.

Figure 1:
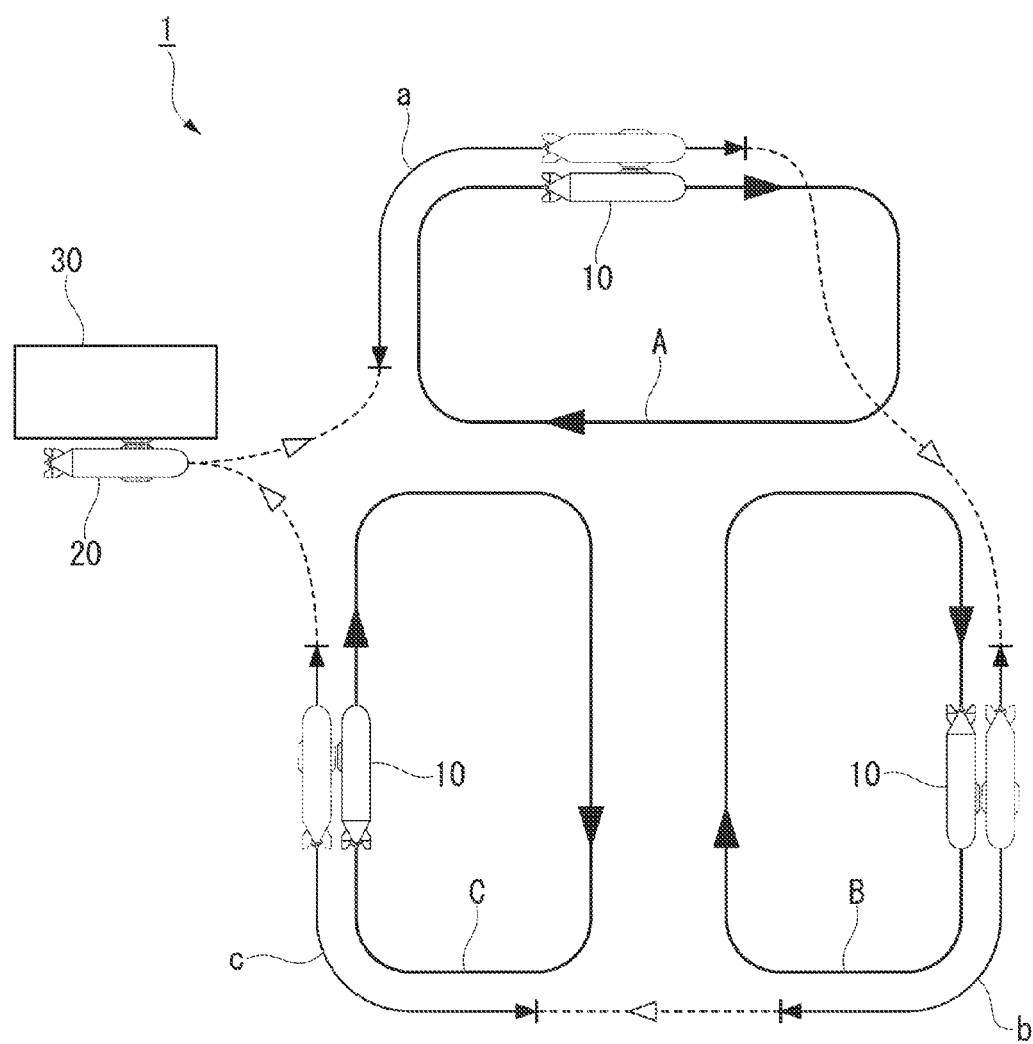
FIG. 1 is a schematic diagram showing an entire configuration of a wireless power supply system according to an embodiment of the present disclosure.
Figure 2:
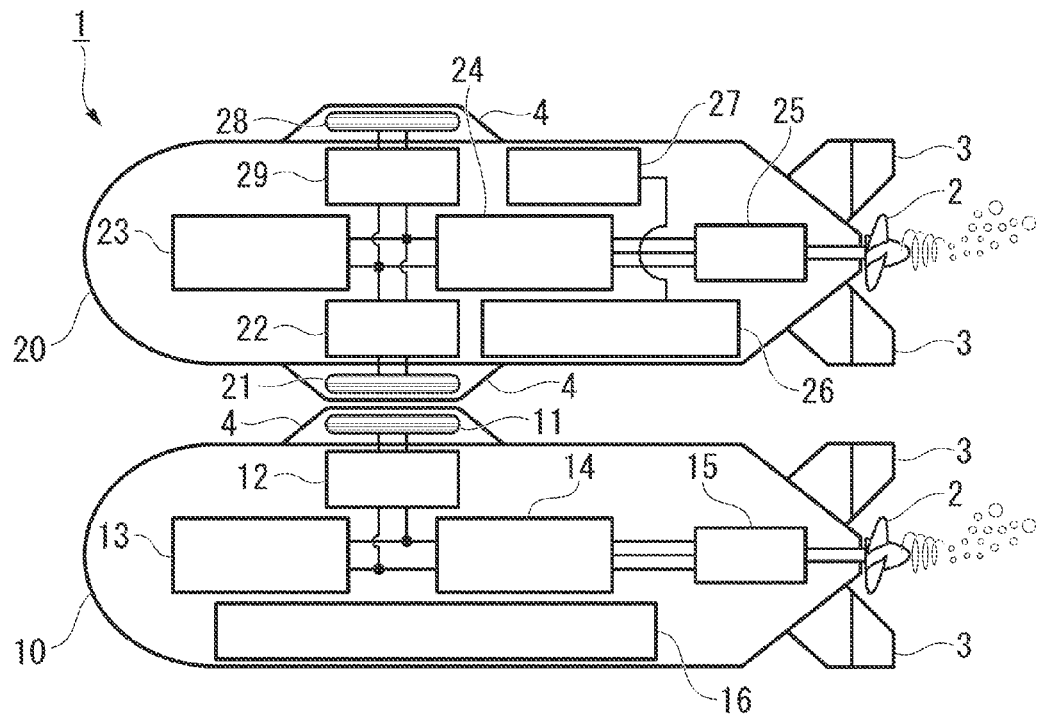
FIG. 2 is a schematic diagram showing a configuration of a first underwater vehicle and a second underwater vehicle according to the embodiment of the present disclosure.
Figure 3:
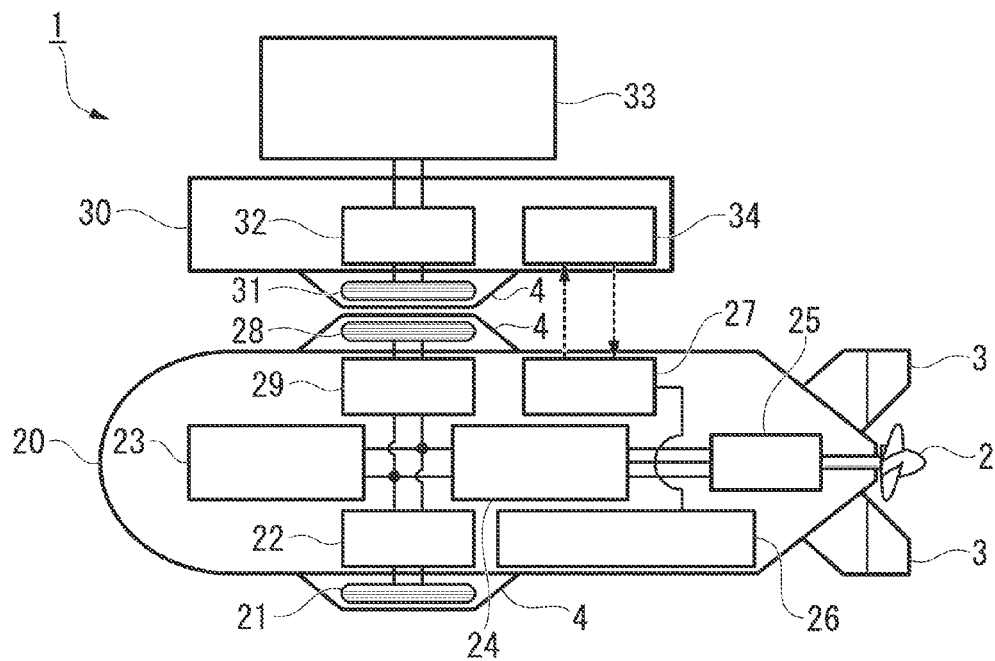
FIG. 3 is a schematic diagram showing a configuration of a power-supplying station according to the embodiment of the present disclosure.

FIG. 1 is a schematic diagram showing an entire configuration of a wireless power supply system 1 according to an embodiment of the present disclosure. FIG. 2 is a schematic diagram showing a configuration of a first underwater vehicle 10 and a second underwater vehicle 20 according to the embodiment of the present disclosure. FIG. 3 is a schematic diagram showing a configuration of a power-supplying station 30 according to the embodiment of the present disclosure.

In the wireless power supply system 1 according to this embodiment, as shown in FIG. 1, a second underwater vehicle 20 supplies electric power to a plurality of first underwater vehicles 10 on a mission, for example, of undersea research for ocean development. The first underwater vehicles 10 and the second underwater vehicle 20 according to this embodiment are autonomous unmanned underwater vehicles that can tracklessly navigate under water, with the first underwater vehicles 10 being used for undersea exploration and the second underwater vehicle 20 being used for power supply.

The first underwater vehicles 10 and the second underwater vehicle 20 have similar shapes and sizes as shown in FIG. 2. When the first underwater vehicles 10 and the second underwater vehicle 20 have similar shape and size, influences of disturbance such as water resistance applied to the first underwater vehicles 10 and the second underwater vehicle 20 during navigation are substantially equal to each other, and parallel navigation control in the wireless power supply system 1 is facilitated. Actuators of the first underwater vehicles 10 and the second underwater vehicle 20 have substantially similar basic configurations. Here, "similar" does not mean that they are completely the same, but means that the parallel navigation of the second underwater vehicle 20 with the first underwater vehicles 10 can be controlled so that wireless supply of electric power from the second underwater vehicle 20 to the first underwater vehicles 10 will be performed without any trouble.

Examples of the actuators include a main thruster 2, upper and lower rudders (upper and lower rudder fins) 3 and right and left elevators (right and left elevator fins, which are not shown in figures) in the rear part and a vertical thruster (which is not shown in figures) and a horizontal thruster (which is not shown in figures) in the front part. The main thruster 2 is used for speed control. The lateral angle control is performed by controlling the lateral angles of the upper and lower rudders 3 functioning as a steering apparatus, and the horizontal thruster is also used when turning in a smaller radius. The elevation angle control is performed by controlling the elevation angles of the right and left elevators functioning as a steering apparatus, and the vertical thruster is also used when turning in a smaller radius.

As shown in FIG. 2, each first underwater vehicle 10 is provided with a power-receiving coil (power-receiver) 11. Meanwhile, the second underwater vehicle 20 is provided with a power-supplying coil (power-transmitter) 21. The power-receiving coil 11 and the power-supplying coil 21 are disposed behind (inside of) cover members 4 that are formed of a material having sufficient water resistance and pressure resistance and transmissibility of an electromagnetic field used for wireless transmission of electric power, that is, a non-electrically conductive and nonmagnetic material (such as plastics or fiber-reinforced plastics). The surface of the cover member 4 is shaped to be smooth, so that fluid resistance that disturbs navigation is reduced.

The power-receiving coil 11 is disposed in the upper part of a substantially cylindrical main body of the first underwater vehicle 10. The power-receiving coil 11 has a coil diameter substantially equal to that of the power-supplying coil 21 and wirelessly receives AC power by being electromagnetically coupled to the power-supplying coil 21. Since an electrode or a connector exposed to the outside is not necessary in the wireless supply of electric power, possibility of the electrode or connector being destroyed by an external influence is eliminated and corrosion of the electrode in water is prevented Here, "substantially equal" does not mean that they are completely equal, but means that they are so similar that electric power can be wirelessly supplied from the power-supplying coil 21 to the power-receiving coil 11. As long as the wireless supply of electric power is possible, the shape or type of the power-receiving coil 11 or the power-supplying coil 21 can be arbitrary, and the power-receiving coil 11 and the power-supplying coil 21 may have different shapes.

The wireless supply of electric power from the power-supplying coil 21 to the power-receiving coil 11 in the wireless power supply system 1 according to this embodiment is performed based on a magnetic resonance method. Each of the power-supplying coil 21 and the power-receiving coil 11 is connected to a resonance capacitor (which is not shown in figures) for constituting a resonance circuit. Furthermore, the capacitance values of the resonance capacitors are set such that the resonance frequency of the power-supply resonance circuit including the power-supplying coil 21 and the resonance capacitor is equal to the resonance frequency of the power-receiving resonance circuit including the power-receiving coil 11 and the resonance capacitor, for example.

The first underwater vehicle 10 is provided with a power-receiving circuit 12, a storage battery 13, an inverter 14, a motor 15, and a mission instrument 16, in addition to the power-receiving coil 11.

The power-receiving circuit 12 is a power conversion circuit that converts electric power received from the power-supplying coil 21 into DC power and supplies the DC power to the storage battery 13. The power-receiving circuit 12 charges the storage battery 13 by supplying a charging current corresponding to the state of charge of the storage battery 13 to the storage battery 13.

The storage battery 13 is a secondary battery that can store sufficient electric power as a driving power source of the first underwater vehicle 10 and is a lithium ion battery or a nickel-hydrogen secondary battery, for example. The storage battery 13 is charged with the DC power supplied from the power-receiving circuit 12 and supplies (discharges) driving power for navigation to the inverter 14.

The inverter 14 converts the supplied DC power into AC power and supplies three-phase current for driving to the motor 15. The motor 15 is connected to the main thruster 2 and rotates the main thruster 2. The electric power of the storage battery 13 is supplied to other actuators as well as the main thruster 2.

The mission instrument 16 is an instrument appropriate for a mission of the first underwater vehicle 10 and is a SONAR (sound navigation and ranging) for examining the topography of a seabed, for example. The mission instrument 16 is installed in the lower part of the substantially cylindrical main body of the first underwater vehicle 10. The mission instrument 16 of the first underwater vehicle 10 may be an instrument for acquiring stratum information of the seabed, distribution information of specific chemical substances of seawater, and the like as well as the topographical information of the seabed.

The power-supplying coil 21 is installed in the lower part of the substantially cylindrical main body of the second underwater vehicle 20. The second underwater vehicle 20 is provided with a power-supplying circuit 22, a storage battery 23, an inverter 24, a motor 25, a power-supply navigation control device (controller) 26, and a communication device 27, in addition to the power-supplying coil 21. The second underwater vehicle 20 is further provided with a power-receiving coil 28 and a power-receiving circuit 29 for receiving electric power from a power-supplying station 30 to be described later. The configurations of the inverter 24, the motor 25, the power-receiving coil 28, and the power-receiving circuit 29 will be omitted for the purpose of avoiding repetition of the aforementioned description.

The power-supplying circuit 22 is a power conversion circuit that converts DC power supplied from the storage battery 23 into AC power and that supplies the AC power to the power-supplying coil 21. The power-supplying circuit 22 supplies the power-supplying coil 21 with an AC current corresponding to the resonance frequency of the wireless power supply using a magnetic resonance method.

The storage battery 23 according to this embodiment serves as a driving power source of the second underwater vehicle 20 and also serves as a power supply source to the first underwater vehicle 10. Since the second underwater vehicle 20 is not equipped with the mission instrument 16 and the empty space can be utilized, the storage battery 23 has sufficient capacity and size which is double or more of those of the storage battery 13 of the first underwater vehicle 10.

The power-supply navigation control device 26 controls the power-supply navigation of the second underwater vehicle 20. The power-supply navigation control device 26 causes the second underwater vehicle 20 to move in parallel to the first underwater vehicle 10 at the time of wireless supply of electric power by controlling the actuators installed in the second underwater vehicle 20. Specifically, the power-supply navigation control device 26 identifies the current position of the second underwater vehicle 20 and controls the second underwater vehicle to move in parallel to the first underwater vehicle 10. The power-supply navigation control device 26 includes the communication device 27 for identifying the current position of the second underwater vehicle 20.

The communication device 27 communicates with a communication device 34 installed in the power-supplying station 30 as shown in FIG. 3. The power-supplying station 30 is provided with a power-supplying coil 31, a power-supplying circuit 32, and an external power source 33 for supplying electric power to the storage battery 23 of the second underwater vehicle 20. The wireless supply of electric power from the power-supplying coil 31 to the power-receiving coil 28 is carried out based on the magnetic resonance method as described above.

For underwater positioning, acoustic positioning using ultrasonic waves is generally employed. For example, an USBL (ultra-short baseline) method may be employed for the acoustic positioning. In the USBL, a distance to a target (second underwater vehicle 20) is determined from a round-trip time of sound waves and a sound velocity in the water. An angle will be determined from a phase difference of sound waves in a wave receiver array (an array in which a plurality of wave receivers are arranged) of the USBL and the relative position of the target (second underwater vehicle 20) in a three-dimensional space relative to a USBL transceiver (wave transmitter and receiver) will be calculated.

In the power-supplying station 30 equipped with the transceiver, by adding the relative position to the target (second underwater vehicle 20) to the position (longitude and latitude) of the transceiver in the terrestrial coordinate system and an attitude angle (the inclination from a horizontal line and the azimuth), the latitude and longitude of the target (second underwater vehicle 20) is acquired. By transmitting the position to the second underwater vehicle 20 by acoustic communication, the second underwater vehicle 20 can acquire the current position. An inertial navigation method may be employed as the underwater positioning or may be used together with the acoustic positioning in order to enhance accuracy of the navigation.

The inertial navigation method is a method of measuring the attitude angle (the lateral angle, the elevation angle, and the azimuth angle) of a target (second underwater vehicle 20) and the velocity of the target (second underwater vehicle 20) relative to the seabed in a three-dimensional space using a sensor (for example, a Doppler flowmeter and the like) installed in the target (second underwater vehicle 20) at short time intervals, calculating the direction in which the target moves in the terrestrial coordinates and the distance the target moves, and compositing vector of the moving distance and the direction. The inertial navigation method has a merit that a position can be measured at short intervals, but a position error increases with the lapse of time. Hence, accumulation of the position error can be prevented by periodically replacing the position measured by the inertial navigation method with the position measured by the USBL in which the position error does not increase with the lapse of time.

The power-supply navigation control device 26 performs control of making the second underwater vehicle 20 return to the power-supplying station 30 based on the state of charge of the storage battery 23. The power-supply navigation control device 26 according to this embodiment performs control of stopping the wireless supply of electric power and making the second underwater vehicle 20 return to the power-supplying station 30 when the state of charge of the storage battery 23 is equal to or less than a threshold value. The threshold value in this embodiment is set to a value for securing electric power required for navigation of the second underwater vehicle 20 returning to the power-supplying station 30.

The power-supply navigation control device 26 is configured to repetitively update the threshold value depending on the distance of the second underwater vehicle 20 from the power-supplying station 30. That is, the farther the second underwater vehicle 20 moves away from the power-supplying station 30, the larger the electric power required for the returning navigation to the power-supplying station 30 becomes. Accordingly, the power-supply navigation control device 26 is configured to repetitively update the threshold value to a larger value as the second underwater vehicle 20 moves farther away from the power-supplying station 30 and to repetitively update the threshold value to a smaller value as the second underwater vehicle moves closer to the power-supplying station 30.

The power supply operation of the wireless power supply system 1 having the above-mentioned configuration will be described below.

In the wireless power supply system 1, as shown in FIG. 1, the second underwater vehicle 20 wirelessly supplies electric power to the first underwater vehicle 10 on a predetermined mission. The first underwater vehicle 10 navigates, for example, a predetermined route (Routes A to C) in the vicinity of the seabed in order to carry out the mission. Routes A to C of the first underwater vehicle 10 and the current position information of the first underwater vehicle 10 are transmitted to the second underwater vehicle 20 through the communication device 27, and the second underwater vehicle 20 performs power-supply navigation based on the position information and its own current position information.

The second underwater vehicle 20 moves so as to approach the first underwater vehicle 10 that is a power supply target and moves in parallel to the first underwater vehicle 10 while the approached state is maintained (indicated by reference signs a to c). The second underwater vehicle 20 performs the wireless transmission of electric power between the power-receiving coil 11 and the power-supplying coil 21 to charge the storage battery 13 of the first underwater vehicle 10 while moving in parallel to the first underwater vehicle 10 as shown in FIG. 2.

In the wireless power supply system 1 according to this embodiment, since the wireless supply of electric power is carried out while the second underwater vehicle 20 moves in parallel to the first underwater vehicle 10, the first underwater vehicle 10 can receive electric power while carrying out its mission and it is thus possible to enhance the availability of the first underwater vehicle 10.

In this embodiment, the magnetic resonance method is employed for transmission of electric power under water between the power-receiving coil 11 and the power-supplying coil 21, and the magnetic resonance method has higher tolerance to a positional misalignment of the resonance coils installed in the first underwater vehicle 10 and the second underwater vehicle 20 compared to an electromagnetic induction method and thus can realize long-distance transmission of electric power with high efficiency.

Therefore, according to this embodiment, since a high-precision positioning mechanism as in the related art is not necessary and a fixing means such as a mechanical fitting structure is not used, the underwater vehicles can be easily detached from each other when an external force is applied. In this embodiment, since positioning is facilitated at the time of starting parallel movement of the first underwater vehicle 10 and the second underwater vehicle 20 thanks to the high tolerance to the positional misalignment between the power-receiving coil 11 and the power-supplying coil 21, it is possible to easily transmit electric power under water between the first underwater vehicle 10 and the second underwater vehicle 20.

In FIG. 1, when the charging of the first underwater vehicle 10 is completed, the second underwater vehicle 20 generally returns to the power-supplying station 30, but when there are a plurality of first underwater vehicles 10 as in this embodiment, the second underwater vehicle moves so as to approach the next first underwater vehicle 10 that is a power supply target and wirelessly supplies electric power thereto as described above. When all the first underwater vehicles 10 that are power supply targets are completely charged, the second underwater vehicle 20 returns to the power-supplying station 30 and the storage battery 23 is charged by the wireless transmission of electric power between the power-receiving coil 28 and the power-supplying coil 31 as shown in FIG. 3.

More specifically, in FIG. 1, the second underwater vehicle 20 first moves so as to approach the first underwater vehicle 10 navigating Route A, moves in parallel to the first underwater vehicle 10 navigating Route A while the approached state is maintained (indicated by reference sign a), and wirelessly supplies electric power to the first underwater vehicle 10 navigating Route A. Accordingly, the storage battery 13 of the first underwater vehicle 10 navigating Route A is charged. Then, the second underwater vehicle 20 moves so as to approach the first underwater vehicle 10 navigating Route B, moves in parallel to the first underwater vehicle 10 navigating Route B while the approached state is maintained (indicated by reference sign b), and wirelessly supplies electric power to the first underwater vehicle 10 navigating Route B. Accordingly, the storage battery 13 of the first underwater vehicle 10 navigating Route B is charged. Then, the second underwater vehicle 20 moves so as to approach the first underwater vehicle 10 navigating Route C, moves in parallel to the first underwater vehicle 10 navigating Route C while the approached state is maintained (indicated by reference sign c), and wirelessly supplies electric power to the first underwater vehicle 10 navigating Route C. Accordingly, the storage battery 13 of the first underwater vehicle 10 navigating Route C is charged. Since charging of all the first underwater vehicles 10 that are power supply targets is completed, the second underwater vehicle 20 returns to the power-supplying station 30 and charges the storage battery 23 by the wireless transmission of electric power between the power-receiving coil 28 and the power-supplying coil 31 as shown in FIG. 3.

When the plurality of first underwater vehicles 10 are supplied with electric power from the single second underwater vehicle 20 in this way, the navigation distance of the second underwater vehicle 20 is large and thus the amount of supply power consumption also increases. Accordingly, the wireless power supply system 1 includes the power-supply navigation control device 26 that makes the second underwater vehicle 20 return to the power-supplying station 30 based on the state of charge of the storage battery 23.

Specifically, the power-supply navigation control device 26 communicates with the communication device 34 of the power-supplying station 30 using the communication device 27 and acquires distance information of the second underwater vehicle 20 from the power-supplying station 30.

Then, the power-supply navigation control device 26 calculates electric power required for the second underwater vehicle 20 to return to the power-supplying station 30 based on the distance information and monitors the state of charge of the storage battery 23 based on the calculated electric power. When the state of charge of the storage battery 23 is likely to be less than the calculated electric power, specifically, when the state of charge is equal to or less than a threshold value obtained by adding a predetermined margin to the calculated electric power, the power-supply navigation control device 26 stops the wireless supply of electric power and forces the second underwater vehicle 20 to return to the power-supplying station 30. Accordingly, it is possible to secure electric power required for the navigation of the second underwater vehicle 20 returning to the power-supplying station 30.

As described above, according to this embodiment, by employing the configuration including the first underwater vehicle 10 having the power-receiving coil 11 for wirelessly receiving electric power and the second underwater vehicle 20 having the power-supplying coil 21 for wirelessly supplying electric power and transmitting electric power between the power-receiving coil 11 and the power-supplying coil 21 while moving in parallel to the first underwater vehicle 10, it is possible to provide a wireless power supply system 1 that can enhance the availability of the first underwater vehicle 10 and to prevent the first underwater vehicle 10 and the second underwater vehicle 20 from being damaged due to an influence of an external force.

While the exemplary embodiment of the present disclosure has been described with reference to the accompanying drawings, the present disclosure is not limited to the embodiments. Various shapes and combinations of the elements described in the embodiment are only examples and can be modified in various forms depending on design requirements without departing from the gist of the present disclosure.

Figure 4:
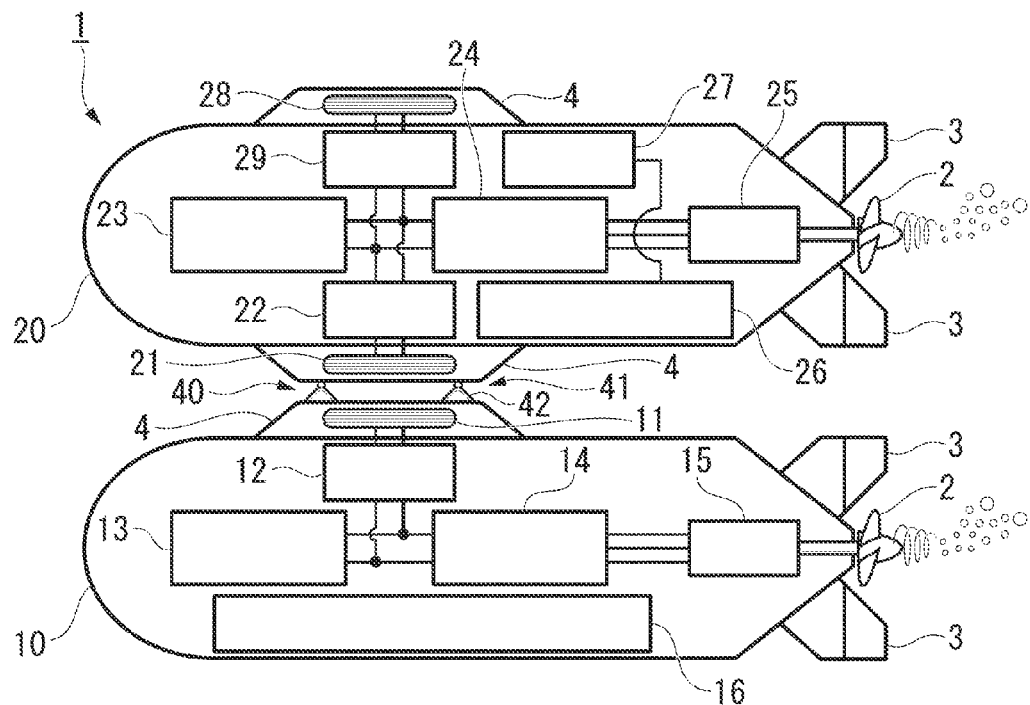
FIG. 4 is a schematic diagram showing a configuration of a positioner for positioning a power-receiving coil and a power-supplying coil according to another embodiment of the present disclosure.
Figure 5:
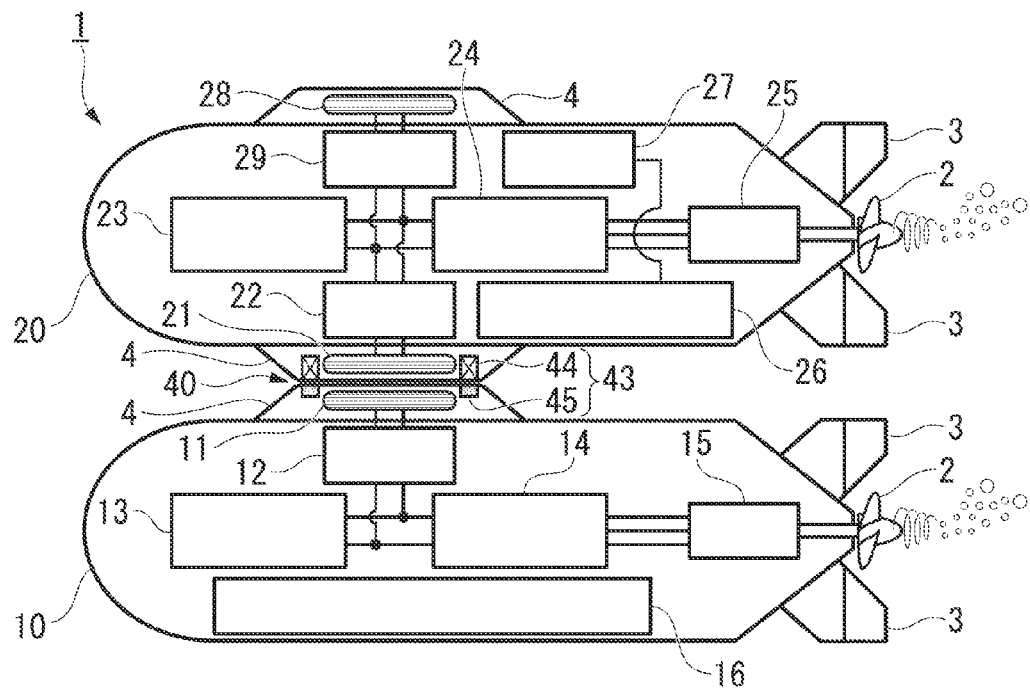
FIG. 5 is a schematic diagram showing a configuration of a positioner for positioning a power-receiving coil and a power-supplying coil according to still another embodiment of the present disclosure.
Figure 6:
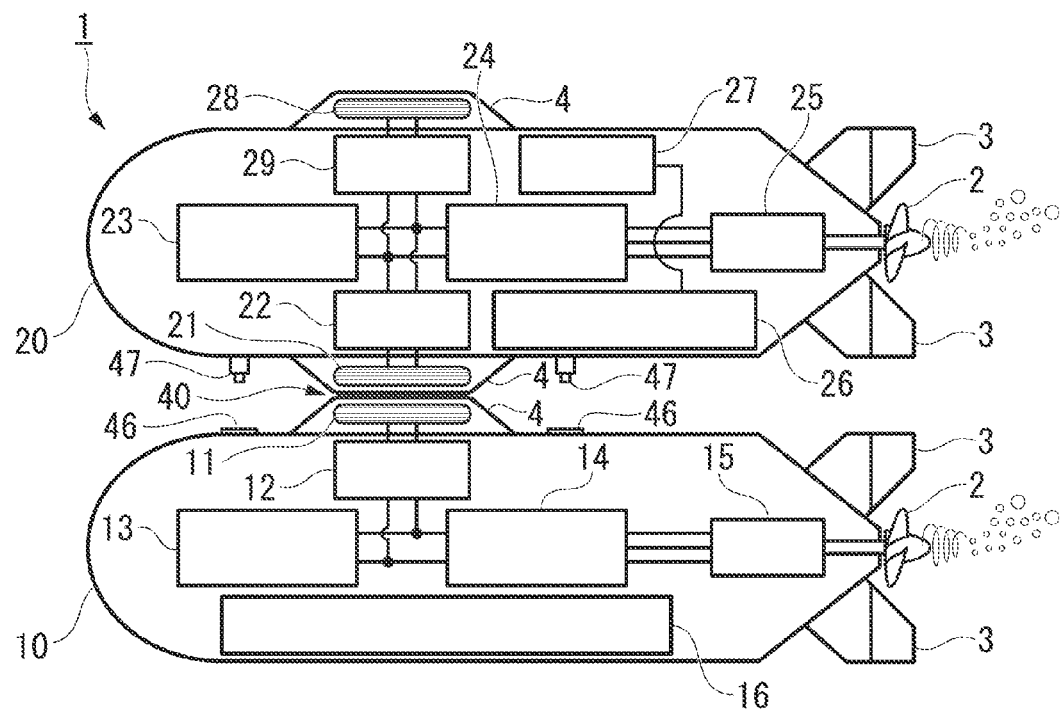
FIG. 6 is a schematic diagram showing a configuration of a positioner for positioning a power-receiving coil and a power-supplying coil according to still another embodiment of the present disclosure.

For example, in order to enhance power efficiency when the first underwater vehicle 10 and the second underwater vehicle 20 move in parallel, a positioner 40 for positioning the power-receiving coil 11 and the power-supplying coil 21 may be provided as shown in FIGS. 4 through 6.

FIG. 4 is a schematic diagram showing the configuration of the positioner 40 for positioning the power-receiving coil 11 and the power-supplying coil 21 according to another embodiment of the present disclosure.

The positioner 40 shown in FIG. 4 includes a suction device 41 for attaching the first underwater vehicle 10 and the second underwater vehicle 20 by suction. The suction device 41 shown in FIG. 4 is constituted by a suction pad member 42 installed in the second underwater vehicle 20 and is configured to press the suction pad member 42 against the flat portion of the cover member 4 of the first underwater vehicle 10 for attachment.

According to this configuration, it is possible to position the power-receiving coil 11 and the power-supplying coil 21 to enhance the power supply efficiency. Furthermore, it is not necessary to install a mechanical fitting structure in the first underwater vehicle 10 and the second underwater vehicle 20. Accordingly, when an external force is applied, it is possible to shake off the attachment force of the suction device 41 and to allow the first underwater vehicle 10 and the second underwater vehicle 20 to be easily detached from each other.

When the movement in parallel is started, the suction pad of the suction pad member 42 may be drained with a pump that is not shown. When the movement in parallel is ended, a valve (not shown in figures) connecting the inside and the outside of the suction pad of the suction pad member 42 may be opened to inject water into the suction pad.

FIG. 5 is a schematic diagram showing the configuration of the positioner 40 for positioning the power-receiving coil 11 and the power-supplying coil 21 according to still another embodiment of the present disclosure.

The positioner 40 shown in FIG. 5 includes a magnetic attachment 43 for magnetically attaching the first underwater vehicle 10 and the second underwater vehicle 20. The magnetic attachment 43 shown in FIG. 5 includes an electromagnet 44 installed in the second underwater vehicle 20 and an iron piece 45 installed in the first underwater vehicle 10, and is configured to perform the positioning through mutual attraction between the electromagnet and the iron piece on the rear side of the cover member 4.

According to this configuration, it is possible to position the power-receiving coil 11 and the power-supplying coil 21 to enhance the power supply efficiency. It is not necessary to install a mechanical fitting structure in the first underwater vehicle 10 and the second underwater vehicle 20. Accordingly, when an external force is applied, it is possible to shake off the magnetic attachment force of the magnetic attachment 43 and to allow the first underwater vehicle 10 and the second underwater vehicle 2 to be easily detached from each other.

From the viewpoint of power consumption, it is preferable that the electromagnet 44 be turned "ON" when the movement in parallel is started and the electromagnet 44 be turned "OFF" when the movement in parallel ends.

FIG. 6 is a schematic diagram showing the configuration of the positioner 40 for positioning the power-receiving coil 11 and the power-supplying coil 21 according to still another embodiment of the present disclosure.

The positioner 40 shown in FIG. 6 includes markers 46 installed in the first underwater vehicle 10 and a marker detector 47 installed in the second underwater vehicle 20 so as to detect the markers 46. The marker detector 47 shown in FIG. 6 is constituted by an underwater camera (preferably equipped with an illuminator) and is configured to detect an image of the markers 46 provided on the front and rear portions between which the power-receiving coil 11 is placed.

According to this configuration, by measuring the positional misalignment of the second underwater vehicle 20 from the first underwater vehicle 10 and correcting the navigation route of the second underwater vehicle 20 so as to correct the positional misalignment through image processing, it is possible to position the power-receiving coil 11 and the power-supplying coil 21 and to enhance the power supply efficiency.

The marker detector 47 is not limited to the underwater camera, but may be an ultrasonic sensor that detects the markers 46, for example, from a reflection intensity and a reflection time of ultrasonic waves.

The configuration in which the second underwater vehicle 20 includes the power-supplying coil 21 and the power-receiving coil 28 has been described in this embodiment, but the second underwater vehicle 20 may be provided with a single coil capable of wirelessly supplying electric power in two-ways, so as to be used as a power-receiving coil when receiving electric power from the power-supplying station 30 and to be used as a power-supplying coil when supplying electric power to the first underwater vehicle 10. In this case, the power-receiving coil 11 of the first underwater vehicle 10 can be installed in the lower part of the substantially cylindrical main body of the first underwater vehicle 10 and the single coil for wirelessly supplying electric power in two-ways can be installed in the upper part of the substantially cylindrical main body of the second underwater vehicle 20.

In the above-mentioned embodiment, the storage battery 23 used as the driving power source of the second underwater vehicle 20 is also used as the power supply source of the first underwater vehicle 10, but another storage battery may be provided.

It has been described in the above-mentioned embodiment that the first underwater vehicle 10 and the second underwater vehicle 20 are autonomous unmanned underwater vehicles capable of tracklessly navigating under water, but at least one of the first underwater vehicle 10 and the second underwater vehicle may be a manned underwater vehicle or the like.

In the above-mentioned embodiment, the power-receiving coil 11 is arranged in the upper part of the substantially cylindrical main body of the first underwater vehicle 10 and the power-supplying coil 21 is arranged in the lower part of the substantially cylindrical main body of the second underwater vehicle 20, but another arrangement may be employed as long as the power-receiving coil 11 and the power-supplying coil 21 are made to face and approach each other so as to enable the wireless supply of electric power from the power-supplying coil 21 to the power-receiving coil 11 when the first underwater vehicle and the second underwater vehicle move in parallel. For example, the power-receiving coil 11 may be arranged on the left side surface of the substantially cylindrical main body of the first underwater vehicle 10 and the power-supplying coil 21 may be arranged on the right side surface of the substantially cylindrical main body of the second underwater vehicle 20. Alternatively, the power-receiving coil 11 may be arranged on the right side surface of the substantially cylindrical main body of the first underwater vehicle 10 and the power-supplying coil 21 may be arranged on the left side surface of the substantially cylindrical main body of the second underwater vehicle 20.

The magnetic resonance method is suitably employed as the wireless power supply method used in the present disclosure, but another wireless power supply method such as an electromagnetic induction method may be used if a decrease in performance such as a decrease in power transmission efficiency is allowed.

INDUSTRIAL APPLICABILITY

It is possible to provide a wireless power supply system that can enhance an availability of an underwater vehicle and prevent the underwater vehicle from being damaged.

The invention claimed is:

1. A wireless power supply system comprising:
a first underwater vehicle that has a power-receiver for wirelessly receiving electric power; and
a second underwater vehicle that has a power-transmitter for wirelessly supplying electric power and transmits electric power between the power-receiver and the power-transmitter while moving in parallel to the first underwater vehicle,
wherein the second underwater vehicle is driven with a storage battery, and
wherein the wireless power supply system further comprising:
a power-supplying station that supplies electric power to the storage battery; and
a controller for making the second underwater vehicle return to the power-supplying station based on a state of charge of the storage battery.

2. The wireless power supply system according to claim 1, wherein the controller stops the wireless supply of electric power and makes the second underwater vehicle return to the power-supplying station when the state of charge of the storage battery is equal to or less than a threshold value.

3. The wireless power supply system according to claim 2, wherein the controller repetitively updates the threshold value based on a distance of the second underwater vehicle from the power-supplying station.

4. The wireless power supply system according to claim 3, wherein the power-transmitter supplies electric power stored in the storage battery.

5. The wireless power supply system according to claim 2, wherein the power-transmitter supplies electric power stored in the storage battery.

6. The wireless power supply system according to claim 1, further comprising a positioner for positioning the power-receiver and the power-transmitter when performing the wireless supply of electric power.

7. The wireless power supply system according to claim 6, wherein the positioner includes a suction device for attaching the first underwater vehicle and the second underwater vehicle by suction.

8. The wireless power supply system according to claim 6, wherein the positioner includes a magnetic attachment for magnetically attaching the first underwater vehicle and the second underwater vehicle.

9. The wireless power supply system according to claim 6, wherein the positioner includes:
a marker that is installed in the first underwater vehicle; and
a marker detector installed in the second underwater vehicle so as to detect the marker.

* * * * *